Dec. 11, 1934.   L. H. L'HOLLIER   1,983,667
METHOD OF MAKING A MOLDED RUBBER ARTICLE
Filed April 13, 1932   2 Sheets-Sheet 1
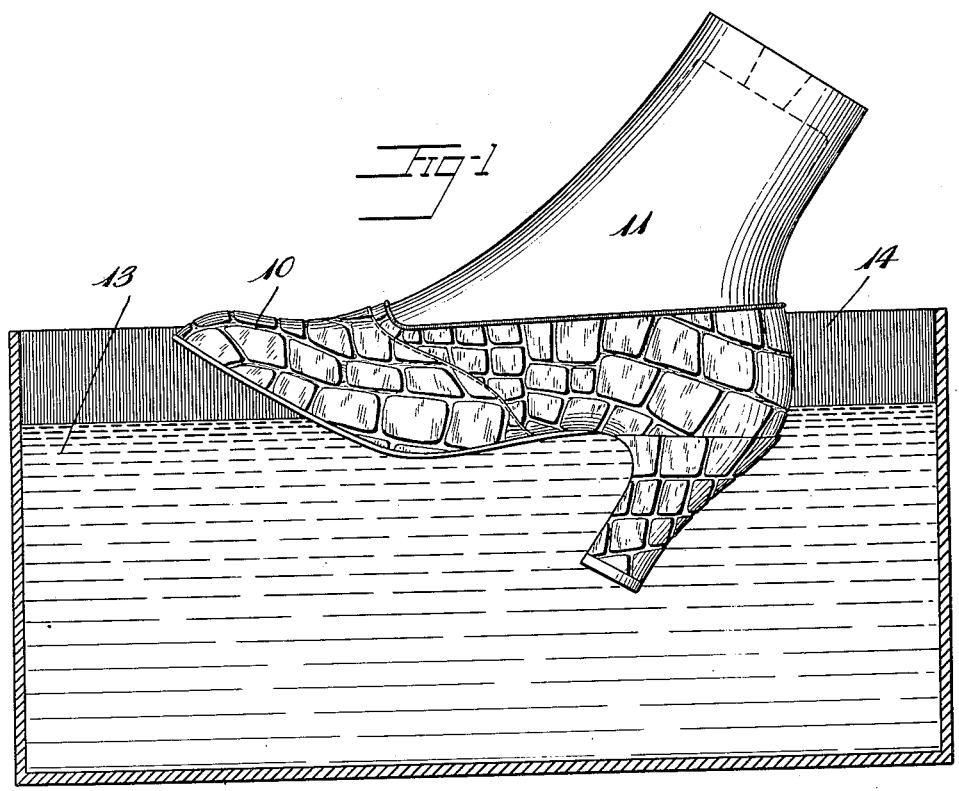
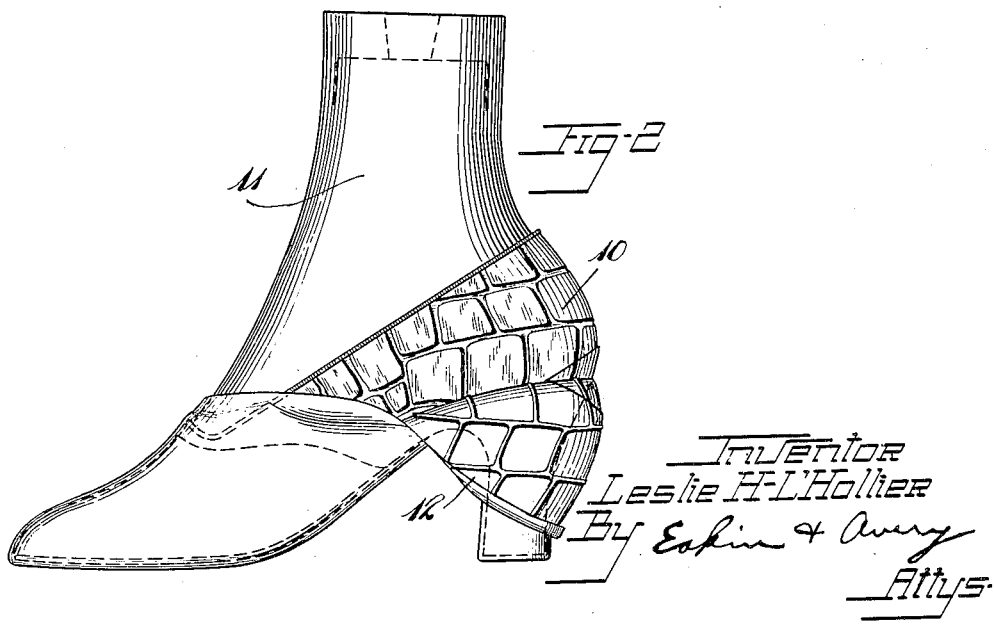
Inventor
Leslie H. L'Hollier
By Eakin & Avery
Attys.

Dec. 11, 1934.  L. H. L'HOLLIER  1,983,667
METHOD OF MAKING A MOLDED RUBBER ARTICLE
Filed April 13, 1932   2 Sheets-Sheet 2
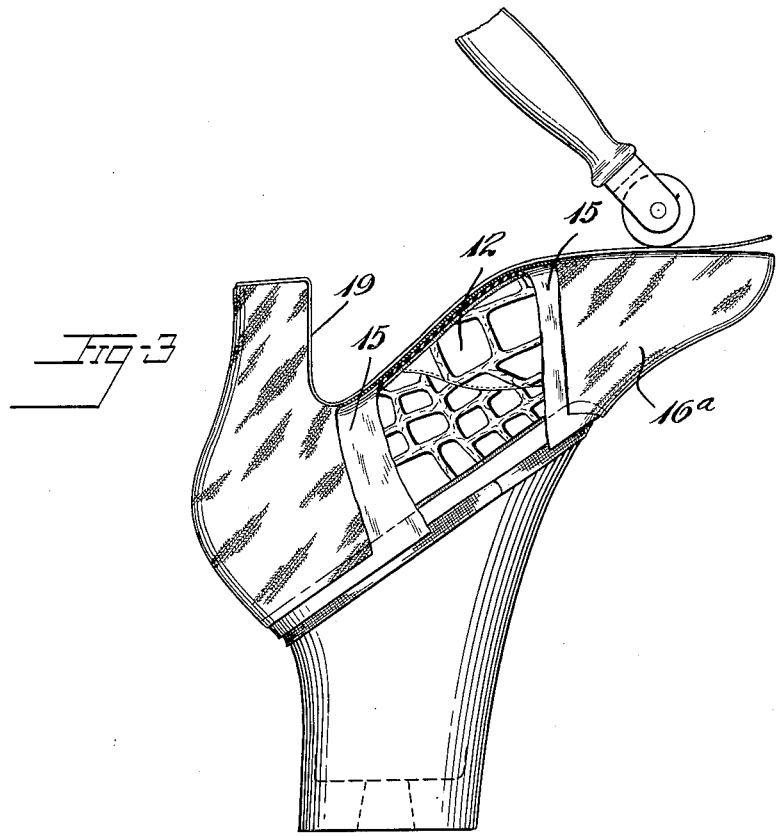
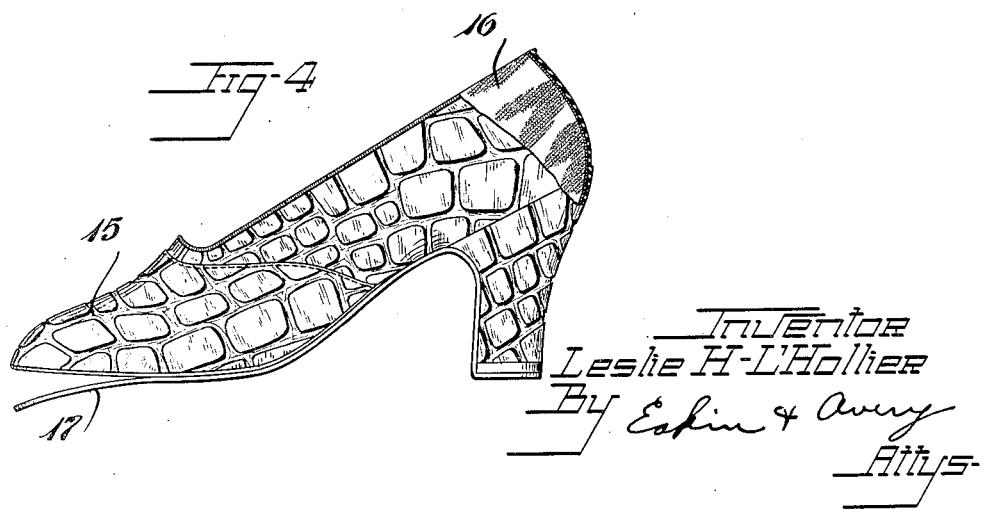

Patented Dec. 11, 1934

1,983,667

UNITED STATES PATENT OFFICE 1,983,667

METHOD OF MAKING A MOLDED RUBBER ARTICLE

Leslie H. L'Hollier, Waltham, Mass., assignor to The B. F. Goodrich Company, New York, N. Y., a corporation of New York Application April 13, 1932, Serial No. 604,909

12 Claims. (Cl. 18—58)

This invention relates to molded rubber articles, a rubber shoe being chosen for purposes of illustration herein, and to methods of producing the same. This invention is an improvement upon the subject matter of the copending application of V. H. Bodle and E. B. Newton, Serial No. 598,418, filed March 12, 1932, for Method of making a rubber article having a molded outer surface; and the copending application of A. A. Glidden, Serial No. 603,812, filed April 7, 1932, for Molded rubber article and process of making the same.

Its chief objects are to provide a highly exact reproduction in rubber of the surface appearance of an article previously formed of rubber, leather or other material; to provide improved procedure for obtaining that result; and to economize in equipment expense.

Of the accompanying drawings:

Fig. 1 is a vertical section of a tank partially filled with a liquid dispersion of rubber, including in elevation, in the process of being dipped therein, a last having mounted thereon a leather shoe that is to be duplicated in rubber.

Fig. 2 is an elevation of the last and leather shoe, and, in process of being stripped therefrom, a layer of rubber deposited thereon from the rubber-dispersion bath in the tank of Fig. 1.

Fig. 3 is an elevation illustrating a later step in the process.

Fig. 4 is an elevation of the final product, a portion of the outsole being shown as pulled away from the rest of the shoe, to illustrate its being formed as a separate member.

Referring to the drawings, a leather shoe 10 to be duplicated in rubber is mounted upon a last 11 and coated with a layer of rubber 12 (Fig. 2) by dipping the last with the leather shoe thereon in a bath of aqueous or solvent dispersed rubber, preferably latex, 13, in a tank 14 (Fig. 1), preferably to a depth such that the deposited layer extends a little way onto the last above the leather shoe.

Repeated dippings may be given to accumulate a layer of adequate thickness and in the case of dipping in an aqueous rubber dispersion the deposition may be expedited by applying a coagulant to each deposit after partially drying it and before the next dipping, but preferably no coagulant is used upon the leather shoe before the first dipping, as the relatively thin first layer of rubber deposited without the use of the coagulant fills more intimately the minute recesses of the surface of the leather shoe and thus provides a more perfect imitation of a leather surface.

After the rubber layer 12 has been built up to the desired thickness it is partially or completely dried and then it may be vulcanized while remaining upon the leather shoe and last, unless vulcanized latex is used, in which case drying is sufficient. It is then stripped off and turned inside out, as illustrated in Fig. 2. It is then mounted upon a last and vulcanized, if this has not already been done, providing a male negative or matrix of the surface design to be reproduced, and the dipping and drying process just described with reference to Fig. 1 is repeated, with the male negative 12 substituted for the original leather shoe upon the last, to produce a rubber upper which, when stripped from the last and turned to bring its embossed surface to the exterior, is a duplicate in rubber of the surface design of the original leather shoe, such an upper being shown at 15 in Fig. 4, as it appears after being built into a shoe.

The upper may either be stripped from the male negative and built into the shoe with other parts such as the lining 16 and calendered outsole 17 of Fig. 4 or, alternatively, fabric parts such as the lining 16ª and other parts such as the insole 1° ._. Fig. 3 may be applied to the upper 15 while it remains, with its embossed face still in contact with the male negative 12, upon the last, and the resulting structure then turned inside out to bring the embossed surface of the upper to the exterior, and the assembly is mounted upon a suitable last and dried and, unless vulcanized latex has been used for forming the upper, is then vulcanized, the excess rubber being trimmed about the top of the shoe to provide the finished product of Fig. 4.

The invention is not wholly limited to the production of a complete upper or in fact to the production of shoe parts, as features of it are applicable to articles of generally flat or other less irregular forms and of various shapes and surface configurations, and various modifications are possible within the scope of the appended claims.

I claim:

1. The method of making a hollow rubber article which comprises molding a layer of rubber upon a previously formed article to provide a female negative rubber matrix, turning the same inside out to provide a male negative rubber matrix, molding a layer of rubber upon the said male negative rubber matrix, and turning the last said layer inside out to present its matrix-molded surface as an outer surface of the final product.

2. A method as defined in claim 1 in which at least one of the molding operations defined is performed by effecting a deposit of rubber from a liquid dispersion of rubber.

3. A method as defined in claim 1 in which at least one of the molding operations defined is performed by effecting a deposit of rubber from a liquid dispersion of rubber without the use of a coagulant as to the portion first deposited.

4. The method of producing a molded rubber article which comprises molding a layer of rubber upon the surface of an article of which the surface is yielding and is to be reproduced in rubber, the molding being effected by depositing the rubber upon the article without substantial pressure against it, removing the said layer to provide a negative rubber matrix, and then effecting deposit of a layer of rubber from a liquid dispersion of rubber upon the face of the said rubber matrix without the use of a coagulant as to the portion first deposited and with the use of a coagulant as to a portion thereof subsequently deposited.

5. The method of producing a molded rubber article which comprises effecting deposit of a layer of rubber from a liquid dispersion of rubber upon an article of which the surface is yielding and its configuration is to be reproduced in rubber, the said deposit being effected without the use of a coagulant as to the portion first deposited and with the use of a coagulant as to a portion thereof subsequently deposited, and then drying the deposit and removing it from the article to provide a negative rubber matrix, and molding a layer of rubber upon the said rubber matrix.

6. A method as defined in claim 5 in which the last-mentioned layer of rubber is molded by effecting deposit of the layer upon the matrix from a liquid dispersion of rubber without the use of a coagulant as to the portion first deposited and with the use of a coagulant as to a portion thereof subsequently deposited.

7. The method of producing a molded rubber article which comprises molding a layer of rubber against a leather surface by deposition without substantial pressure against it to produce a negative rubber matrix and molding rubber against the face of said matrix.

8. The method of producing a molded rubber article which comprises effecting deposit of a layer of rubber from a liquid dispersion of rubber upon a leather surface to produce a negative rubber matrix and molding rubber against the face of said matrix.

9. The method of producing a molded rubber article which comprises effecting deposit of a layer of rubber from a liquid dispersion of rubber upon a leather surface to produce a negative rubber matrix and then effecting deposit of a layer of rubber upon said rubber matrix from a liquid dispersion of rubber.

10. The method of producing a rubber article having on its surface a reproduction of the surface of a non-rigid configured material, which method comprises molding a layer of rubber upon said material by deposition of the rubber thereon without substantial pressure against it, removing the said layer to provide a negative rubber matrix, and molding a layer of rubber upon the said rubber matrix by deposition of the rubber thereon without substantial pressure against it.

11. The method of producing a contoured rubber article having as a surface design a reproduction of the surface design of a chosen flexible material which comprises producing by impression a negative matrix of the surface design of the material, molding a layer of rubber against the said negative matrix by deposition thereupon from a liquid dispersion of the rubber without substantial pressure against it without complete vulcanization of said rubber layer, manipulating the last said layer to present its matrix-molded surface as a curved surface of the final product, and vulcanizing it in that curved shape with its matrix-molded surface exposed in a fluid medium.

12. The method of making a contoured rubber article having as a surface design a reproduction of the surface design of a chosen article which comprises producing in a flexible sheet of plastic material by molding a negative reproduction of the surface design of the article, shaping the flexible sheet in contoured form upon an internal form-support to present its negative surface as an outer surface of the form, molding a layer of rubber thereagainst by deposition from a liquid dispersion of the rubber, and removing the last said layer to present its positive molded surface as a surface of the final article.

LESLIE H. L'HOLLIER.